(12) United States Patent
Shim et al.

(10) Patent No.: US 11,241,950 B2
(45) Date of Patent: Feb. 8, 2022

(54) POWERTRAIN FOR HYBRID VEHICLE

(71) Applicants: Hyundai Motor Company, Seoul (KR); Kia Motors Corporation, Seoul (KR)

(72) Inventors: Hyu Tae Shim, Hwaseong-si (KR); Bong Hyun Cho, Gunpo-si (KR); Jae Young Jeon, Osan-si (KR); Byung Dae Choi, Seoul (KR); Hyung Min Kim, Suwon-si (KR); Jin Yong Kim, Incheon (KR); Gwang Soo Hwang, Hwaseong-si (KR); Jun Seong Kang, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/039,660

(22) Filed: Sep. 30, 2020

(65) Prior Publication Data
US 2021/0387520 A1 Dec. 16, 2021

(30) Foreign Application Priority Data
Jun. 12, 2020 (KR) .......................... 10-2020-0071680

(51) Int. Cl.
*B60K 6/365* (2007.10)
*F16H 3/66* (2006.01)
*B60K 6/383* (2007.10)

(52) U.S. Cl.
CPC .............. *B60K 6/365* (2013.01); *B60K 6/383* (2013.01); *F16H 3/66* (2013.01); *F16H 3/663* (2013.01);
(Continued)

(58) Field of Classification Search
None
See application file for complete search history.

(56) References Cited

U.S. PATENT DOCUMENTS 7,192,373 B2 * 3/2007 Bucknor ................. B60L 50/16
475/5
8,231,490 B2 * 7/2012 Park ....................... B60K 6/547
475/5
(Continued)

FOREIGN PATENT DOCUMENTS

CN 110001376 A * 7/2019
DE 102016221045 A1 * 4/2018 ............. B60K 6/547
(Continued)

Primary Examiner — Dirk Wright
(74) Attorney, Agent, or Firm — Morgan, Lewis & Bockius LLP

(57) ABSTRACT

A powertrain for a hybrid vehicle may include a complex planetary gear set including four rotation elements having first, second, third, and fourth rotation elements; a motor-generator fixedly connected to the first rotation element of the complex planetary gear set; a first brake configured to selectively connect the second rotation element of the complex planetary gear set to a transmission housing; an input shaft connected to an engine and configured to be selectively connectable to each of the first rotation element and the third rotation element of the complex planetary gear set; and an output shaft connected to the fourth rotation element of the complex planetary gear set.

4 Claims, 15 Drawing Sheets

(52) U.S. Cl.
 CPC .......... *F16H 3/666* (2013.01); *B60Y 2200/92* (2013.01); *B60Y 2400/732* (2013.01); *F16H 2200/2007* (2013.01); *F16H 2200/2023* (2013.01); *F16H 2200/2041* (2013.01)

(56) References Cited

U.S. PATENT DOCUMENTS

| | | | | |
|---|---|---|---|---|
| 8,491,438 | B2 * | 7/2013 | Kim | B60K 6/547 |
| | | | | 475/282 |
| 9,340,101 | B2 * | 5/2016 | Meißner | F16H 3/725 |
| 10,471,818 | B2 * | 11/2019 | Oba | B60K 6/365 |

FOREIGN PATENT DOCUMENTS

| | | | | |
|---|---|---|---|---|
| DE | 102017209932 A1 * | 12/2018 | ............. | F16H 3/725 |
| JP | 2003278807 A * | 10/2003 | ............. | B60K 6/383 |
| KR | 2009-0132758 A | 12/2009 | | |
| WO | WO-2016188695 A1 * | 12/2016 | ............... | F16H 3/66 |
| WO | WO-2018001622 A1 * | 1/2018 | ............. | B60K 6/365 |
| WO | WO-2019025404 A1 * | 2/2019 | ............. | F16H 3/663 |
| WO | WO-2019025414 A1 * | 2/2019 | ............. | B60K 6/48 |
| WO | WO-2020078627 A1 * | 4/2020 | ............. | B60K 6/48 |

\* cited by examiner

| ITEMS | | OPERATING ELEMENT | | |
|---|---|---|---|---|
| | | CL1 | CL2 | B1 |
| ENGINE MODE (PARALLEL MODE) | FIRST STAGE | O | | O |
| | SECOND STAGE | | O | O |
| | THIRD STAGE | O | O | |
| E-CVT MODE (HIGH SPEED) | | | O | |
| EV MODE | FIRST STAGE | | | O |
| IN-STOP CHARGE MODE | | O | | |

| ITEMS | | OPERATING ELEMENT | | | |
|---|---|---|---|---|---|
| | | CL1 | CL2 | B1 | OWC |
| ENGINE MODE (PARALLEL MODE) | FIRST STAGE | O | | O | O |
| | SECOND STAGE | | O | O | O |
| | THIRD STAGE | O | O | | O |
| | FOURTH STAGE | | O | | O |
| E-CVT MODE (HIGH SPEED) | | | O | | O |
| EV MODE | FIRST STAGE | O | | O | |
| | THIRD STAGE | O | O | | |
| IN-STOP CHARGE MODE | | O | | | |

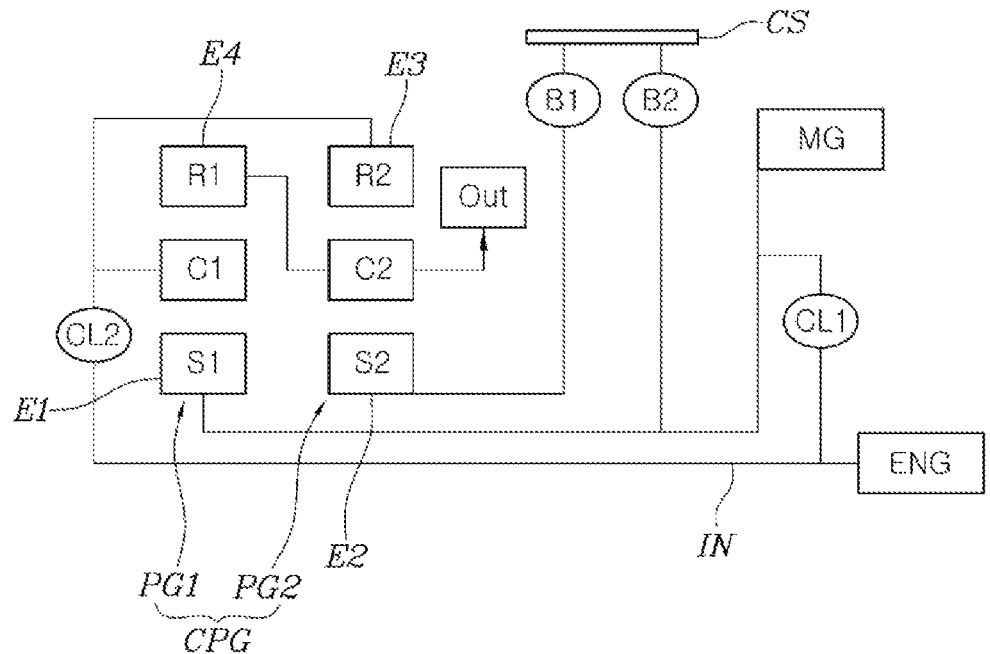

| ITEMS | | OPERATING ELEMENT | | | | |
|---|---|---|---|---|---|---|
| | | CL1 | CL2 | B1 | B2 | OWC |
| ENGINE MODE (PARALLEL MODE) | FIRST STAGE | O | | O | | O |
| | SECOND STAGE | | O | O | | O |
| | THIRD STAGE | O | O | | | O |
| | FOURTH STAGE | | O | | O | O |
| E-CVT MODE (HIGH SPEED) | | | O | | | O |
| EV MODE | FIRST STAGE | O | | O | | |
| | THIRD STAGE | O | O | | | |
| IN-STOP CHARGE MODE | | O | | | | |

| ITEMS | | OPERATING ELEMENT | | |
|---|---|---|---|---|
| | | CL1 | CL2 | B1 |
| ENGINE MODE (PARALLEL MODE) | FIRST STAGE | O | | O |
| | SECOND STAGE | | O | O |
| | THIRD STAGE | O | O | |
| E-CVT MODE (HIGH SPEED) | | | O | |
| EV MODE | FIRST STAGE | | | O |
| IN-STOP CHARGE MODE | | O | | |

| ITEMS | | OPERATING ELEMENT | | | |
|---|---|---|---|---|---|
| | | CL1 | CL2 | B1 | B2 |
| ENGINE MODE (PARALLEL MODE) | FIRST STAGE | O | | O | |
| | SECOND STAGE | | O | O | |
| | THIRD STAGE | O | O | | |
| | FOURTH STAGE | | O | | O |
| E-CVT MODE (HIGH SPEED) | | | O | | |
| EV MODE | FIRST STAGE | | | O | |
| IN-STOP CHARGE MODE | | O | | | | ns # POWERTRAIN FOR HYBRID VEHICLE

CROSS REFERENCE TO RELATED APPLICATION

The present application claims priority to Korean Patent Application No. 10-2020-0071680, filed Jun. 12, 2020, the entire contents of which is incorporated herein for all purposes by this reference.

BACKGROUND OF THE INVENTION

Field of the Invention

The present invention relates to a powertrain structure for a hybrid vehicle.

Description of Related Art

Hybrid vehicles are provided with a powertrain that appropriately combines power from an engine and power from an electric motor so that power performance required for the vehicle may be achieved and fuel efficiency may be improved.

The powertrain of hybrid vehicles includes as few parts as possible, has a simple configuration, and is configured to implement as many shift ranges as possible to improve the fuel efficiency of an engine and achieve power performance required for the vehicles.

The description provided above as a related art of the present invention is just for helping understanding the background of the present invention and may not be construed as being included in the related art known by those skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a powertrain for a hybrid vehicle, the powertrain employing as few parts as possible and having a simple configuration to reduce costs and to be more conveniently mounted in a vehicle, and being configured to implement as many shift ranges as possible to improve the fuel efficiency of an engine and sufficiently achieve power performance required for the vehicle.

To achieve the objectives, a powertrain for a hybrid vehicle of the present invention includes: a complex planetary gear set including four rotation elements; a motor-generator fixedly connected to the first rotation element of the complex planetary gear set; a first brake configured to selectively connect the second rotation element of the complex planetary gear set to a transmission housing; an input shaft connected to an engine and configured to be selectively connectable to each of the first rotation element and the third rotation element of the complex planetary gear set; and an output shaft connected to a fourth rotation element of the complex planetary gear set.

The input shaft may be connected to the engine through a one-way clutch.

The powertrain may further include a second brake configured to selectively connect the first rotation element of the complex planetary gear set to the transmission housing.

The complex planetary gear set may include a first planetary gear set and a second planetary gear set; the first rotation element may be a first sun gear of the first planetary gear set; the second rotation element is a second sun gear of the second planetary gear set; the third rotation element may be implemented by connecting a first planet carrier of the first planetary gear set and a second ring gear of the second planetary gear set; and the fourth rotation element may be implemented by connecting a first ring gear of the first planetary gear set and a second planet carrier of the second planetary gear set.

The complex planetary gear set may include a first planetary gear set and a second planetary gear set; the first rotation element may be a second sun gear of the second planetary gear set; the second rotation element may be a first sun gear of the first planetary gear set; the third rotation element may be implemented by connecting a first ring gear of the first planetary gear set and a second planet carrier of the second planetary gear set; and the fourth rotation element may be implemented by connecting a first planet carrier of the first planetary gear set and a second ring gear of the second planetary gear set.

The complex planetary gear set may include a first planetary gear set and a second planetary gear set; the first rotation element may be implemented by connecting a first sun gear of the first planetary gear set and a second sun gear of the second planetary gear set; the second rotation element may be a second ring gear of the second planetary gear set; the third rotation element may be a first planet carrier of the first planetary gear set; and the fourth rotation element may be implemented by connecting a first ring gear of the first planetary gear set and a second planet carrier of the second planetary gear set.

The complex planetary gear set may include a first planetary gear set and a second planetary gear set; the first rotation element may be a second ring gear of the second planetary gear set; the second rotation element may be implemented by connecting a first sun gear of the first planetary gear set and a second sun gear of the second planetary gear set; the third rotation element may be implemented by connecting a first ring gear of the first planetary gear set and a second planet carrier of the second planetary gear set; and the fourth rotation element may be a first planet carrier of the first planetary gear set.

The complex planetary gear set may be a Ravigneaux type planetary gear set; the first rotation element may be a first sun gear; the second rotation element may be a second sun gear; the third rotation element may be a ring gear, and the fourth rotation element may be a planet carrier.

The complex planetary gear set may be a Ravigneaux type planetary gear set; the first rotation element may be a second sun gear; the second rotation element may be a first sun gear; the third rotation element may be a planet carrier, and the fourth rotation element may be a ring gear.

The complex planetary gear set may include a first planetary gear set and a second planetary gear set; the first rotation element may be a first sun gear of the first planetary gear set; the second rotation element may be implemented by connecting a first ring gear of the first planetary gear set and a second sun gear of the second planetary gear set; the third rotation element may be a second ring gear of the second planetary gear set; and the fourth rotation element may be implemented by connecting a first planet carrier of the first planetary gear set and a second planet carrier of the second planetary gear set.

The complex planetary gear set may include a first planetary gear set and a second planetary gear set; the first rotation element may be implemented by connecting a first ring gear of the first planetary gear set and a second sun gear of the second planetary gear set; the second rotation element may be a first sun gear of the first planetary gear set; the third rotation element may be implemented by connecting a first planet carrier of the first planetary gear set and a second planet carrier of the second planetary gear set; and the fourth rotation element may be a second ring gear of the second planetary gear set.

According to various exemplary embodiments of the present invention, since as less portions as possible are employed and a simple configuration is implemented, being able to reduce costs and more conveniently mount a powertrain in a vehicle. Furthermore, since as many shift ranges are implemented as possible, the fuel efficiency of an engine may be improved and power performance required for the vehicle may be sufficiently achieved.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a diagram showing a third exemplary embodiment of a powertrain for a hybrid vehicle according to the present invention;

FIG. 6 is an operation mode table of the third exemplary embodiment;

Figures 1, 2:
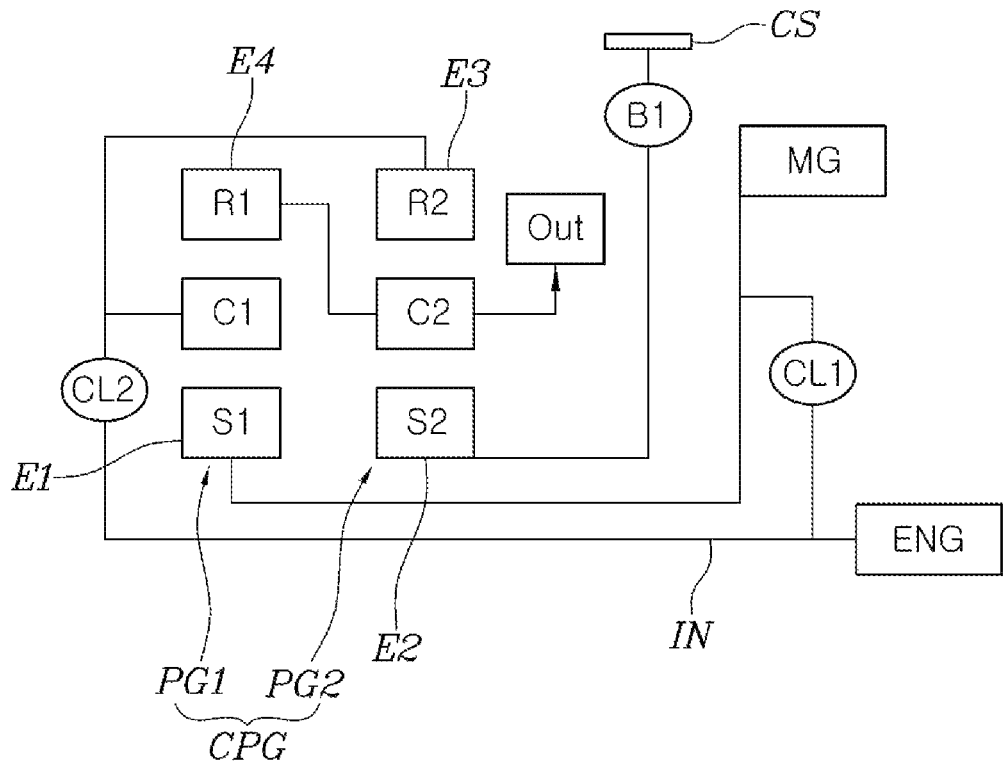
FIG. 1 is a diagram showing a first exemplary embodiment of a powertrain for a hybrid vehicle according to the present invention.
FIG. 2 is an operation mode table of the first exemplary embodiment.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 30:
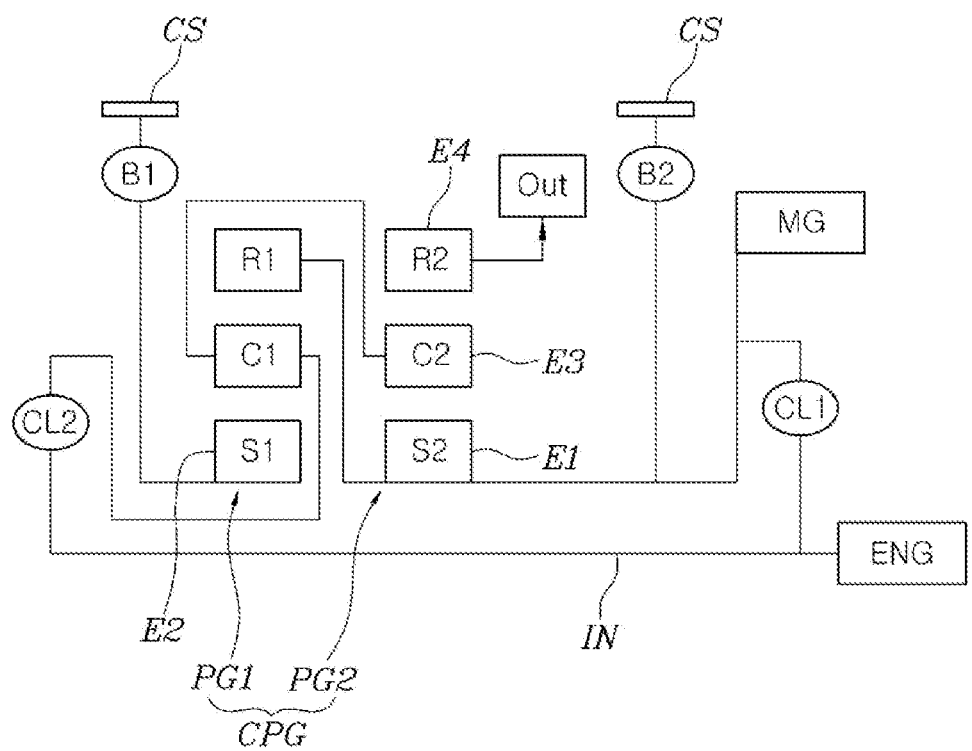
FIG. 30 is a diagram showing a twenty-fourth exemplary embodiment of a powertrain for a hybrid vehicle according to an exemplary embodiment of the present invention.

Referring to FIG. 1, FIG. 2, and FIG. 30, embodiments of a powertrain for a hybrid vehicle of the present invention commonly include: a complex planetary gear set CPG including four rotation elements; a motor-generator MG connected to a first rotation element E1 of the complex planetary gear set CPG; a first brake B1 configured to fix a second rotation element E2 of the complex planetary gear set CPG; an input shaft IN connected to an engine ENG and configured to be selectively connectable to each of the first rotation element E1 and a third rotation element E3 of the complex planetary gear set CPG; and an output shaft OUT connected to a fourth rotation element E4 of the complex planetary gear set CPG.

In the various exemplary embodiments of FIG. 1, as the simplest configuration of the complex planetary gear set CPG, the complex planetary gear set CPG includes a first planetary gear set PG1 and a second planetary gear set PG2; the first rotation element E1 is a first sun gear S1 of the first planetary gear set PG1; the second rotation element E2 is a second sun gear S2 of the second planetary gear set PG2; the third rotation element E3 is implemented by connecting a first planet carrier C1 of the first planetary gear set PG1 and a second ring gear R2 of the second planetary gear set PG2; and the fourth rotation element E4 is implemented by connecting a first ring gear R1 of the first planetary gear set PG1 and a second planet carrier C2 of the second planetary gear set PG2.

That is, the motor-generator MG is connected to the first sun gear S1, the first brake B1 is configured to fix or release the second sun gear S2 to or from a transmission housing CS, the input shaft IN is connected to the second sun gear S2 through a first clutch CL2 and connected to the first planet carrier C1 and the second ring gear R2 through a second clutch CL2, and the output shaft OUT is connected to the first ring gear R1 and the second planet carrier C2.

The various exemplary embodiments having the configuration described above in FIG. 1, in accordance with the operation mode table of FIG. 2, can implement first to third stages in an engine mode, can implement an Electric Continuous Variable Transmission (E-CVT) mode, which can continuously change the gear ratio through the motor-generator MG, and an EV mode which is an electric vehicle mode, and can implement an in-stop charge mode that can perform charging by operating the motor-generator MG using power from an engine ENG while a vehicle is stopped.

Figures 3, 4:
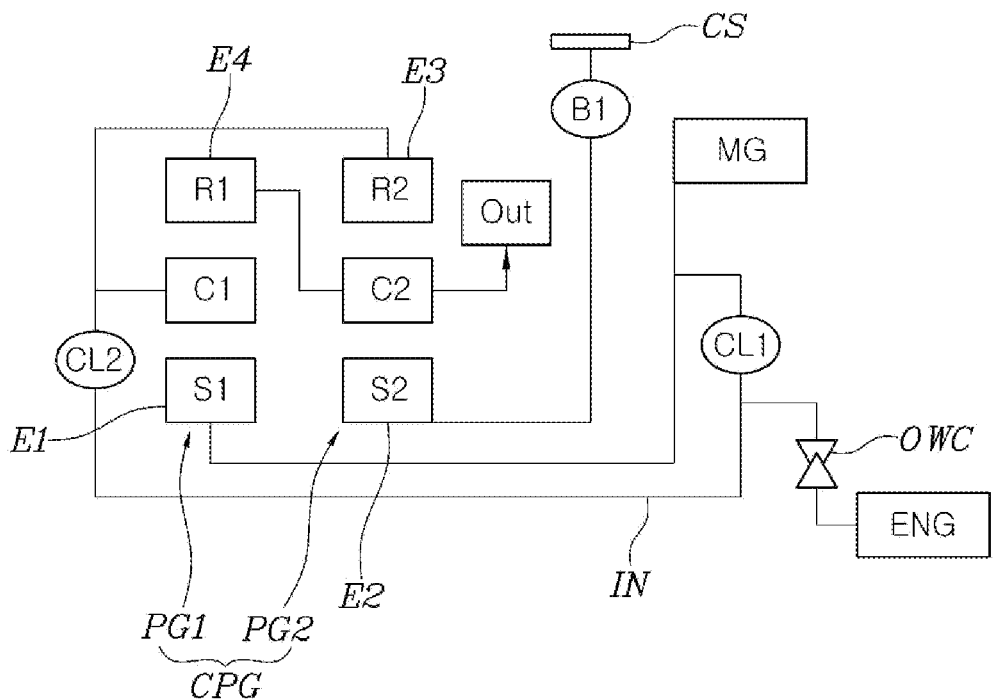
FIG. 3 is a diagram showing a second exemplary embodiment of a powertrain for a hybrid vehicle according to the present invention.
FIG. 4 is an operation mode table of the second exemplary embodiment.

The various exemplary embodiments of FIG. 3 is the same as the various exemplary embodiments of FIG. 1 except that the input shaft is connected to the engine ENG through a one-way clutch OWC, and FIG. 4 is an operation mode table of the various exemplary embodiments of FIG. 3.

When the one-way clutch OWC is additionally mounted between the input shaft IN and the engine, as described above, it is possible to implement a third stage with a gear ratio of 1:1 in the EV mode and it is possible to remove engine drag when a vehicle is driven in the third stage in the EV mode or performs regenerative braking, whereby efficiency of the vehicle is improved.

The various exemplary embodiments of FIG. 5 is the same as the various exemplary embodiments of FIG. 1 except that a second brake B2 configured to fix the first rotation element E1 of the complex planetary gear set CPG is further included.

Since the second brake B2 is further included, a fourth stage is further implemented in the engine mode, as shown in FIG. 6, so it is possible to provide an overdrive gear ratio.

Figures 7, 8:
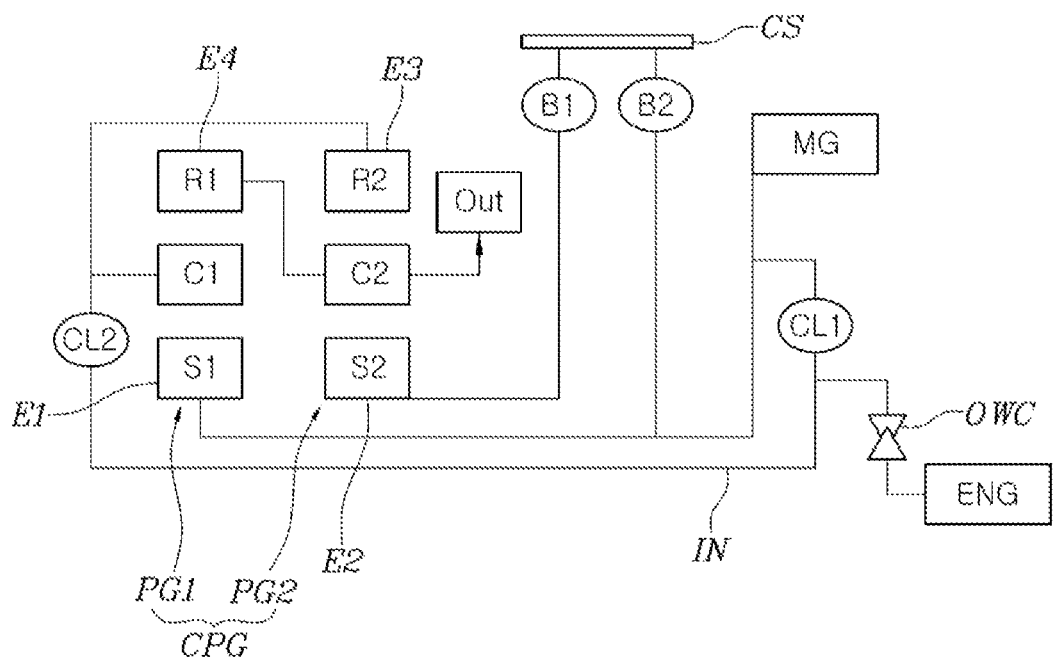
FIG. 7 is a diagram showing a fourth exemplary embodiment of a powertrain for a hybrid vehicle according to the present invention.
FIG. 8 is an operation mode table of the fourth exemplary embodiment.

The various exemplary embodiments of FIG. 7 is the same as the various exemplary embodiments of FIG. 5 except that a one-way clutch OWC is mounted between the input shaft IN and the engine ENG, as in the various exemplary embodiments of FIG. 3.

Accordingly, the various exemplary embodiments of FIG. 7 can further implement in a third state in the EV mode, as shown in FIG. 8, and it is possible to achieve an effect of improving efficiency by removing engine drag when a vehicle is driven in the third stage in the EV mode and performs regenerative braking.

Figures 9, 10:
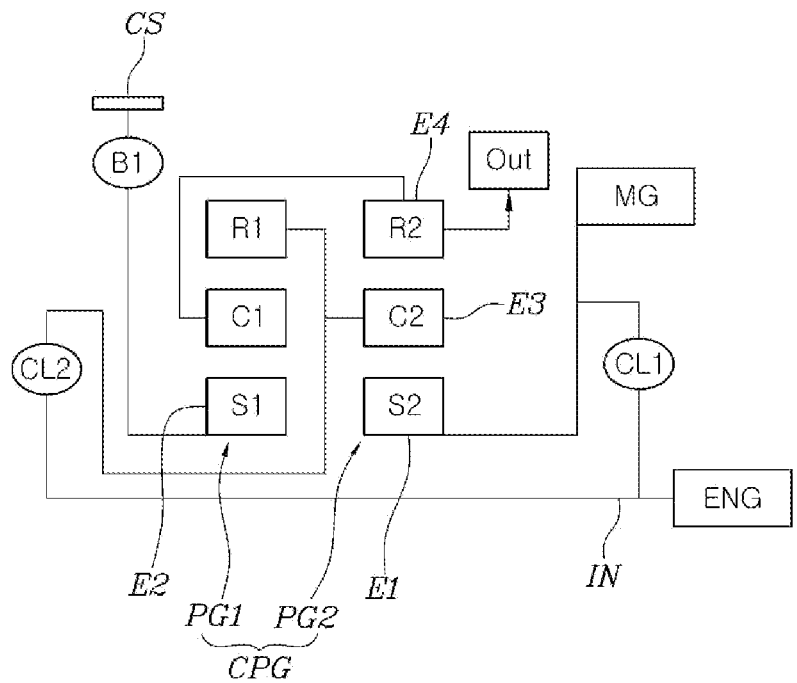
FIG. 9 is a diagram showing a fifth exemplary embodiment of a powertrain for a hybrid vehicle according to the present invention.
FIG. 10 is an operation mode table of the fifth exemplary embodiment.

FIG. 9 shows the various exemplary embodiments of a powertrain of the present invention, the complex planetary gear set CPG includes a first planetary gear set PG1 and a second planetary gear set PG2; the first rotation element E1 is a second sun gear S2 of the second planetary gear set PG2; the second rotation element E2 is a first sun gear S1 of the first planetary gear set PG1; the third rotation element E3 is implemented by connecting a first ring gear R1 of the first planetary gear set PG1 and a second planet carrier C2 of the second planetary gear set PG2; and the fourth rotation element E4 is implemented by connecting a first planet carrier C1 of the first planetary gear set PG1 and a second ring gear R2 of the second planetary gear set PG2.

That is, the various exemplary embodiments of FIG. 9 is substantially similar to the various exemplary embodiments of FIG. 1 and the various exemplary embodiments of FIG. 3 and includes the same complex planetary gear set CPG, but has a difference in that the components connected to the four complex planetary gear set CPG are different, as described above.

The various exemplary embodiments of FIG. 9 can implement several stages, as described above, in accordance with the operation mode table shown in FIG. 10.

Figures 11, 12:
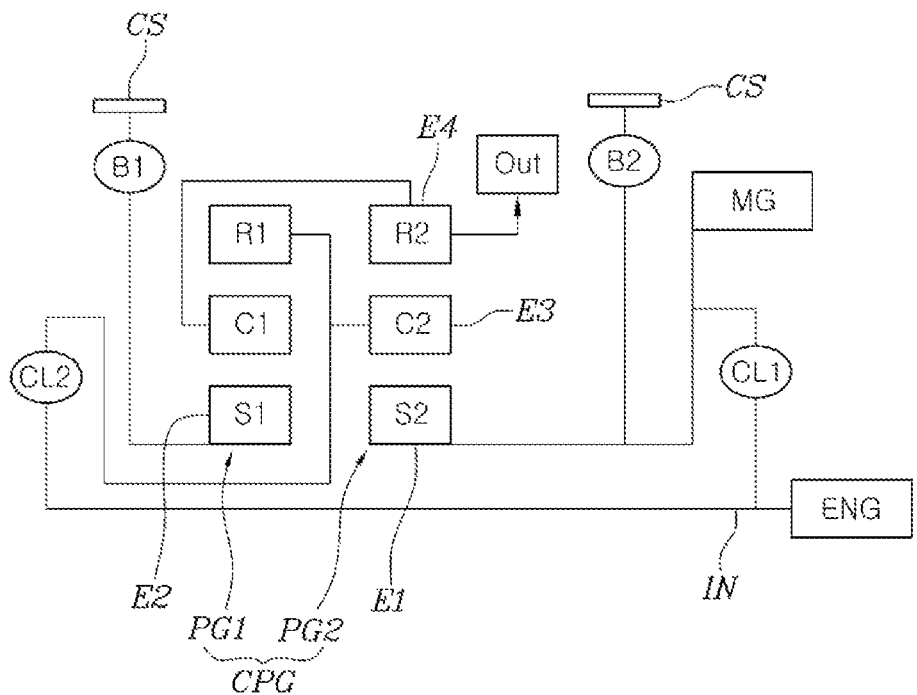
FIG. 11 is a diagram showing a sixth exemplary embodiment of a powertrain for a hybrid vehicle according to the present invention.
FIG. 12 is an operation mode table of the sixth exemplary embodiment.

FIG. 11 shows the various exemplary embodiments of a powertrain of the present invention. The various exemplary embodiments of FIG. 11 is almost the same as the various exemplary embodiments of FIG. 9 except for including a second brake B2 mounted to fix the first rotation element E1 of the complex planetary gear set CPG.

Accordingly, the various exemplary embodiments of FIG. 11 can further implement a fourth stage in the engine mode, as shown in the operation mode table of FIG. 12.

Figure 13:
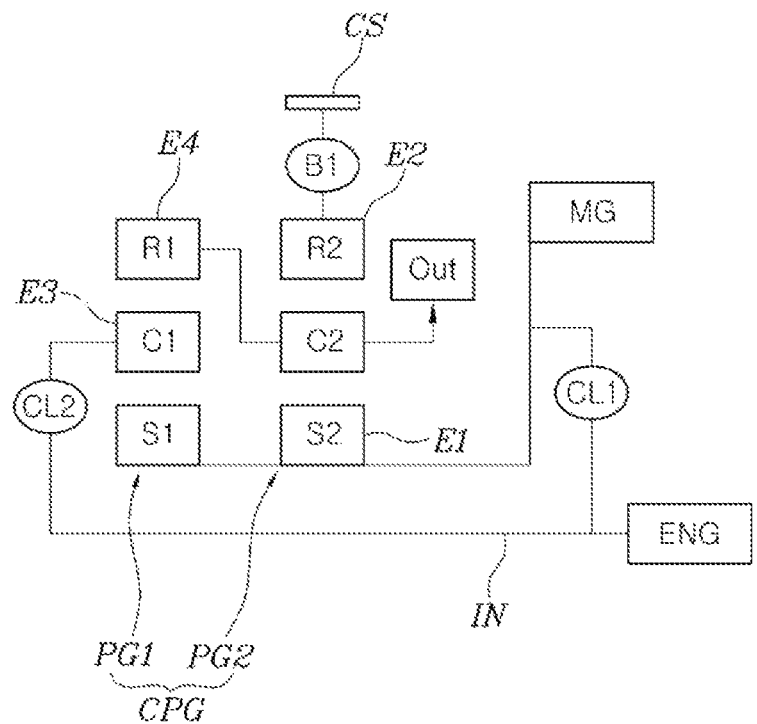
FIG. 13 is a diagram showing a seventh exemplary embodiment of a powertrain for a hybrid vehicle according to the present invention.

In the various exemplary embodiments of FIG. 13, the complex planetary gear set CPG includes a first planetary gear set PG1 and a second planetary gear set PG2; the first rotation element E1 is implemented by connecting a first sun gear S1 of the first planetary gear set PG1 and a second sun gear S2 of the second planetary gear set PG2; the second rotation element E2 is a second ring gear R2 of the second planetary gear set PG2; the third rotation element E3 is a first planet carrier C1 of the first planetary gear set PG1; and the fourth rotation element E4 is implemented by connecting a first ring gear R1 of the first planetary gear set PG2 and a second planet carrier C2 of the second planetary gear set PG2.

Figure 14:
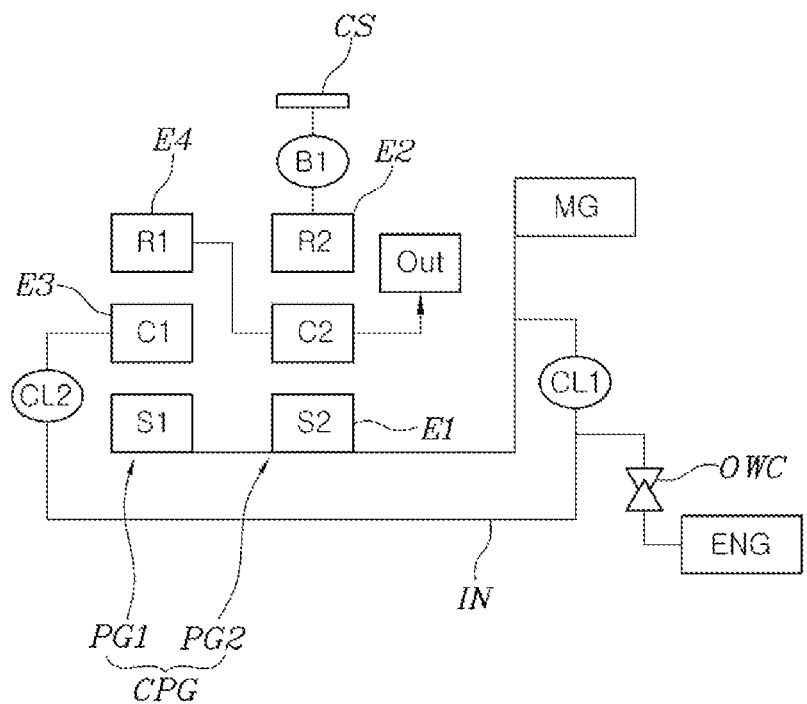
FIG. 14 is a diagram showing an eighth exemplary embodiment of a powertrain for a hybrid vehicle according to the present invention.

The various exemplary embodiments of FIG. 14 is an exemplary embodiment which is almost the same as the various exemplary embodiments of FIG. 13 except only that a one-way clutch OWC is further mounted between the input shaft IN and the engine ENG.

Figure 15:
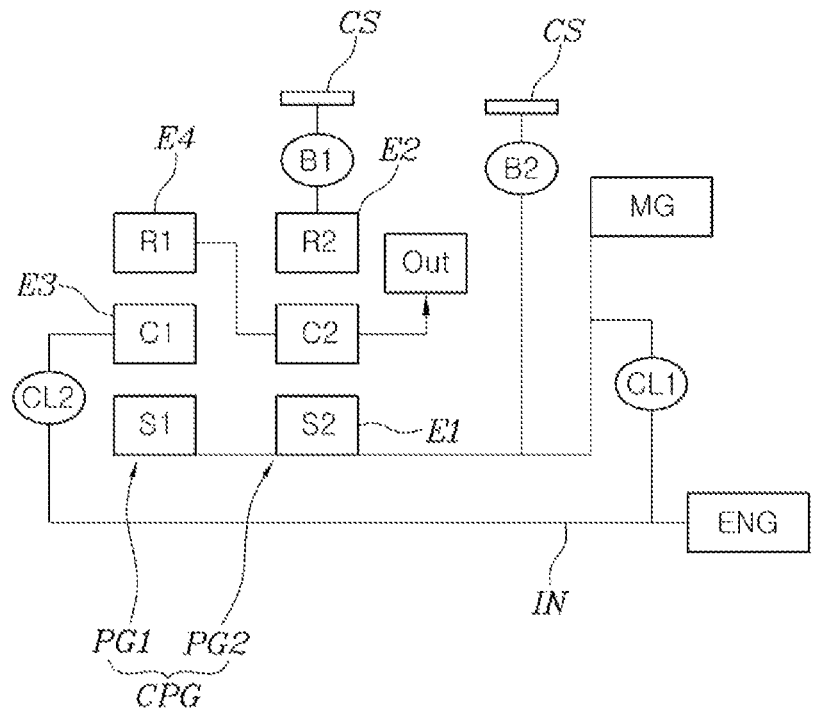
FIG. 15 is a diagram showing a ninth exemplary embodiment of a powertrain for a hybrid vehicle according to the present invention.

The various exemplary embodiments of FIG. 15 is an exemplary embodiment which is almost the same as the various exemplary embodiments of FIG. 13 except only that a second brake B2 that can fix the first rotation element E1 of the complex planetary gear set CPG is further included.

Figure 16:
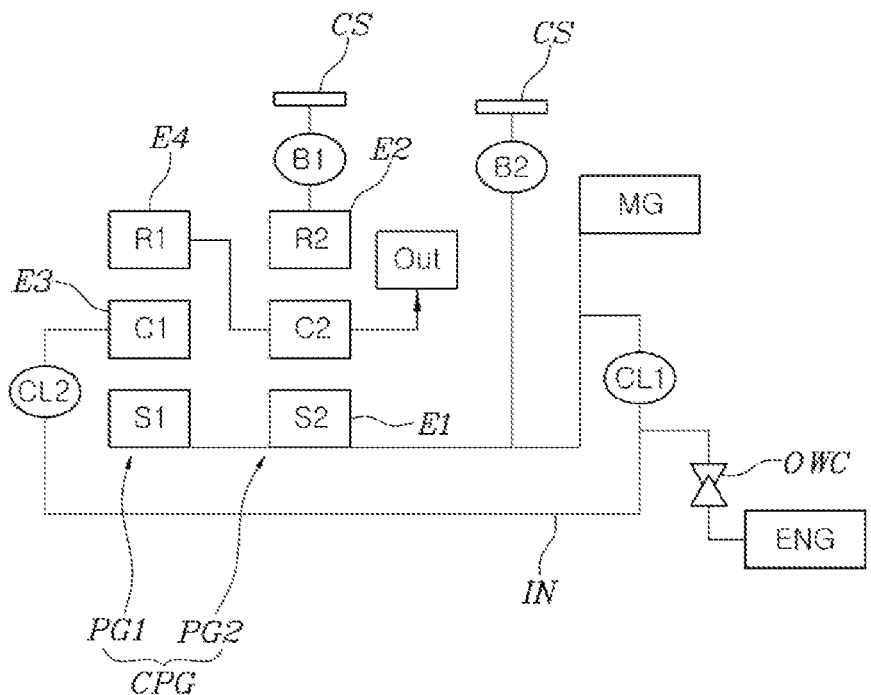
FIG. 16 is a diagram showing a tenth exemplary embodiment of a powertrain for a hybrid vehicle according to the present invention.

The various exemplary embodiments of FIG. 16 is an exemplary embodiment which is almost the same as the various exemplary embodiments of FIG. 15 except only that a one-way clutch OWC is further mounted between the input shaft IN and the engine ENG.

Figure 17:
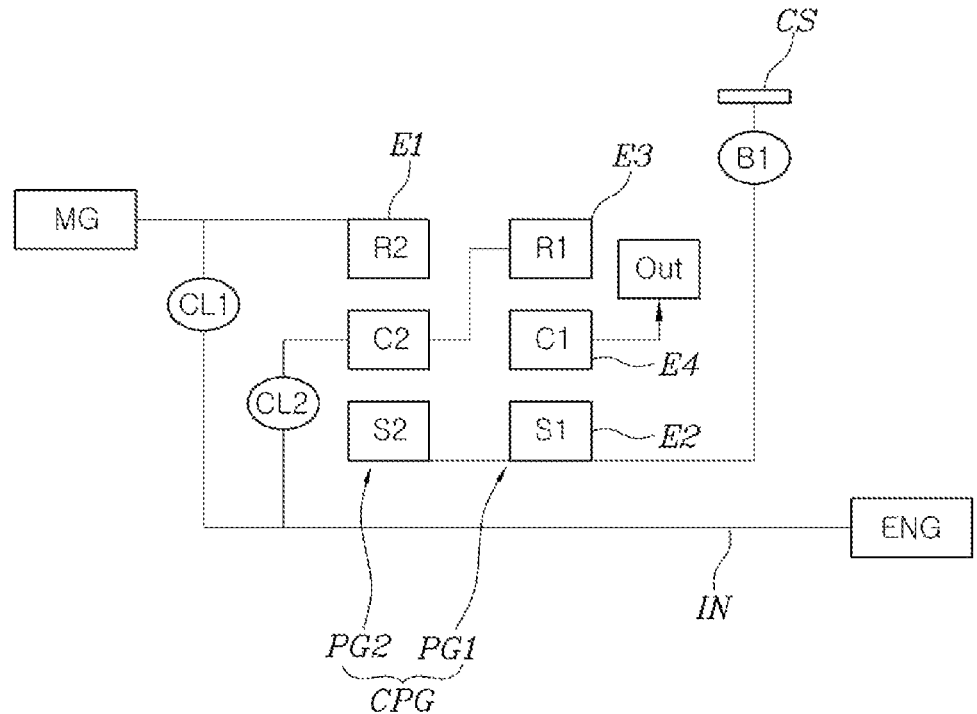
FIG. 17 is a diagram showing an eleventh exemplary embodiment of a powertrain for a hybrid vehicle according to the present invention.

In the eleventh embodiment of FIG. 17, the complex planetary gear set CPG includes a first planetary gear set PG1 and a second planetary gear set PG2; the first rotation element E1 is a second ring gear R2 of the second planetary gear set PG2; the second rotation element E2 is implemented by connecting the first sun gear S1 of the first planetary gear set PG1 and the second sun gear S2 of the second planetary gear set PG2; the third rotation element E3 is implemented by connecting a first ring gear R1 of the first planetary gear set PG1 and a second planet carrier C2 of the second planetary gear set PG2; and the fourth rotation element E4 is a first planet carrier C1 of the first planetary gear set PG1.

Figure 18:
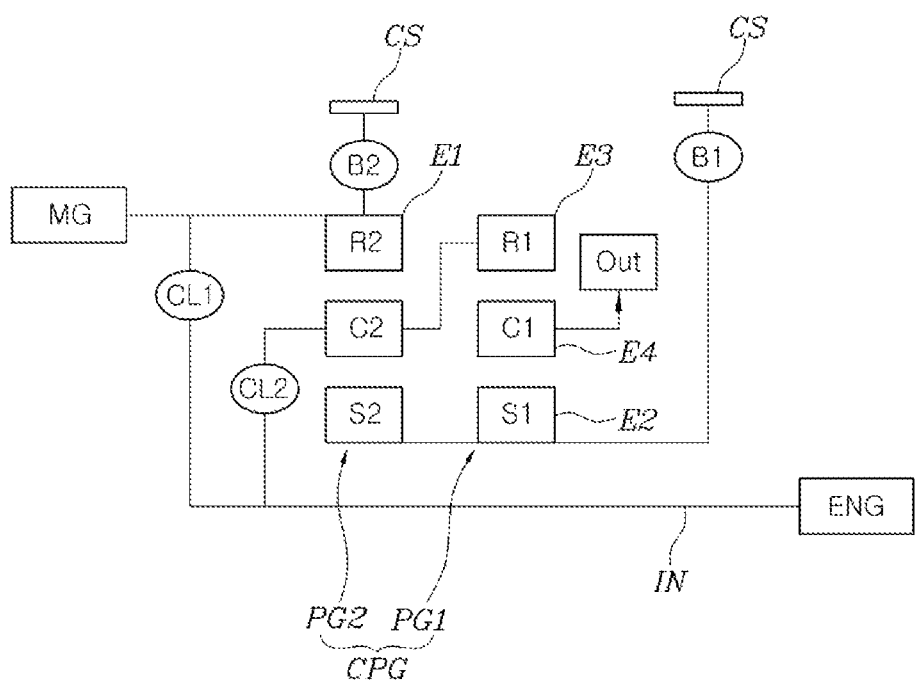
FIG. 18 is a diagram showing a twelfth exemplary embodiment of a powertrain for a hybrid vehicle according to the present invention.

The twelfth embodiment of FIG. 18 is an exemplary embodiment which is almost the same as the eleventh embodiment of FIG. 17 except only that a second brake B2 that can fix the first rotation element E1 of the complex planetary gear set CPG is further included.

Figure 19:
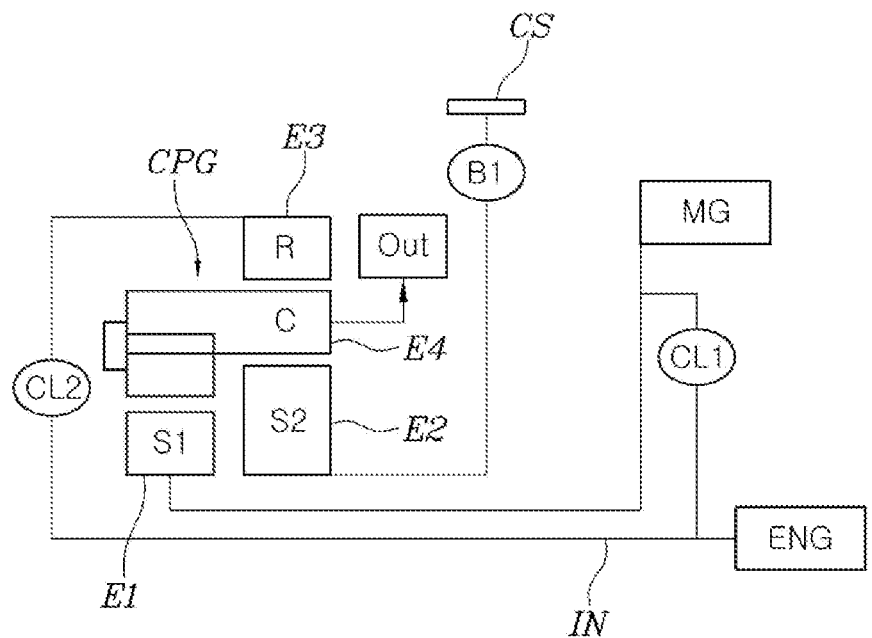
FIG. 19 is a diagram showing a thirteenth exemplary embodiment of a powertrain for a hybrid vehicle according to the present invention.

In the thirteenth embodiment of FIG. 19, the complex planetary gear set CPG is a Ravigneaux type planetary gear set; the first rotation element E1 is a first sun gear S1; the second rotation element E2 is a second sun gear S2; the third rotation element E3 is a ring gear R, and the fourth rotation element E4 is a planet carrier.

Figure 20:
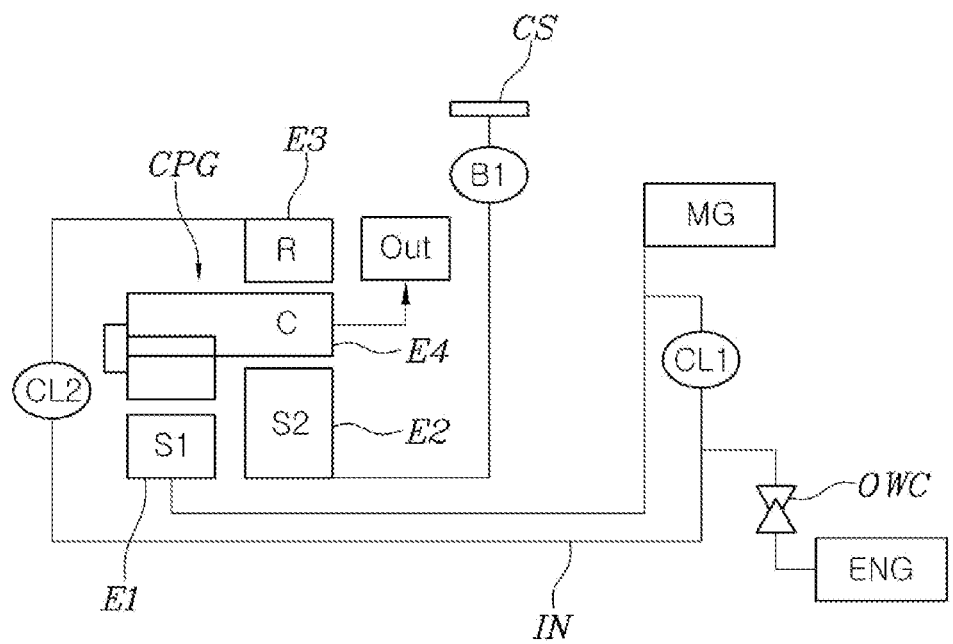
FIG. 20 is a diagram showing a fourteenth exemplary embodiment of a powertrain for a hybrid vehicle according to the present invention.

The fourteenth embodiment of FIG. 20 is an exemplary embodiment which is almost the same as the thirteenth embodiment of FIG. 19 except only that a one-way clutch OWC is added between the input shaft IN and the engine ENG.

Figure 21:
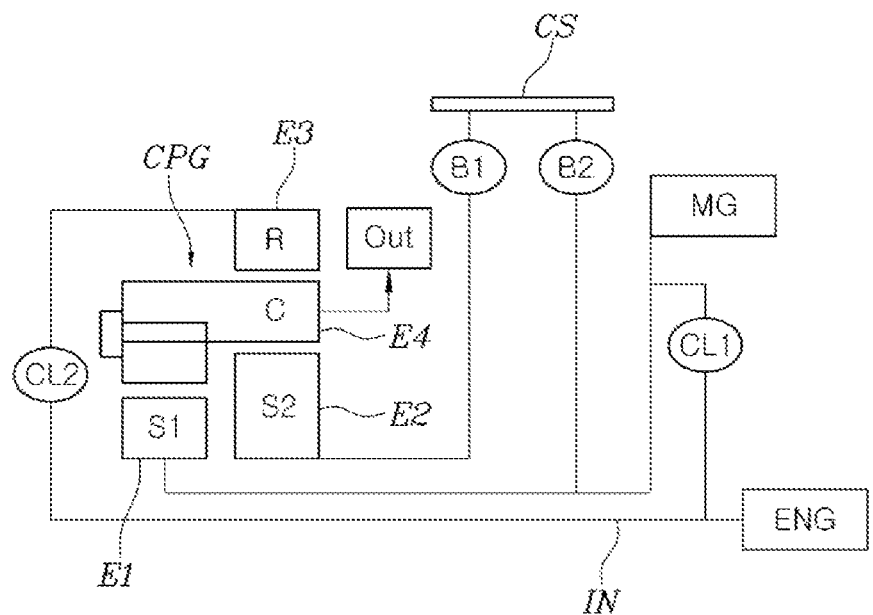
FIG. 21 is a diagram showing fifteenth exemplary embodiment of a powertrain for a hybrid vehicle according to the present invention.

The fifteenth embodiment of FIG. 21 is an exemplary embodiment which is almost the same as the thirteenth embodiment of FIG. 19 except only that a second brake B2 that can fix the first rotation element E1 of the complex planetary gear set CPG is further included.

Figure 22:
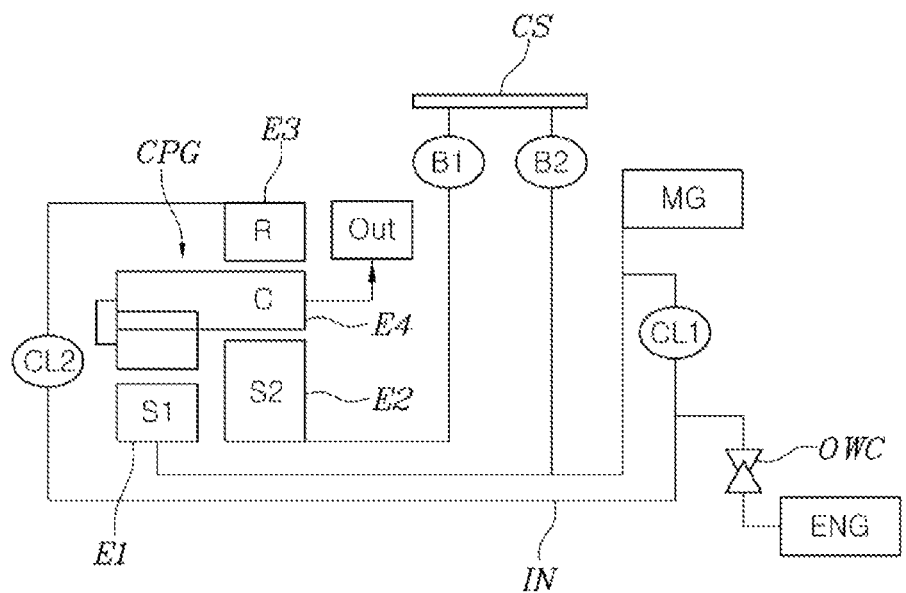
FIG. 22 is a diagram showing a sixteenth embodiment of a powertrain for a hybrid vehicle according to the present invention.

The sixteenth embodiment of FIG. 22 is an exemplary embodiment which is almost the same as the fifteenth embodiment of FIG. 21 except only that a one-way clutch OWC is added between the input shaft IN and the engine ENG.

Figure 23:
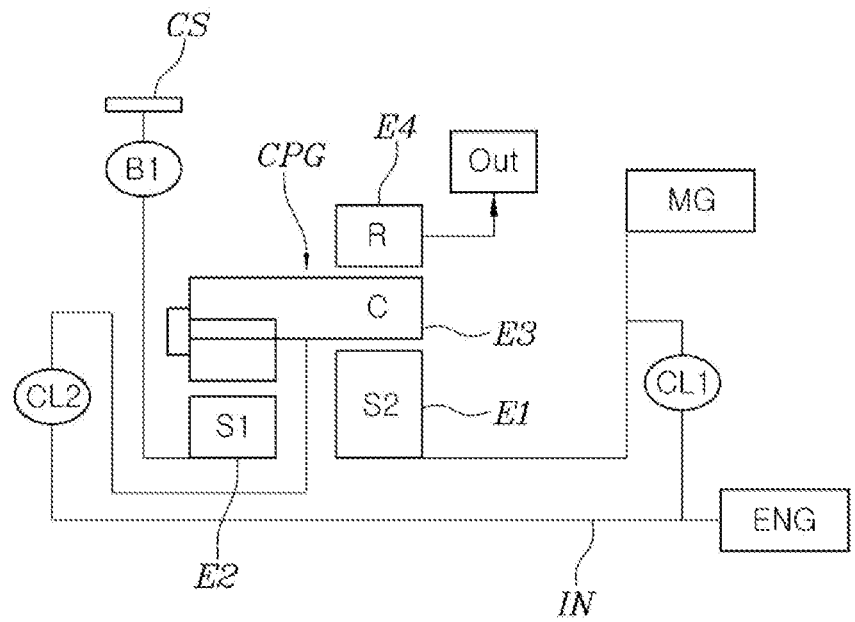
FIG. 23 is a diagram showing a seventeenth exemplary embodiment of a powertrain for a hybrid vehicle according to the present invention.

In the seventeenth embodiment of FIG. 23, the complex planetary gear set CPG is a Ravigneaux type planetary gear set; the first rotation element E1 is a second sun gear S2; the second rotation element E2 is a first sun gear S1; the third rotation element E3 is a planet carrier, and the fourth rotation element E4 is a ring gear R.

Figure 24:
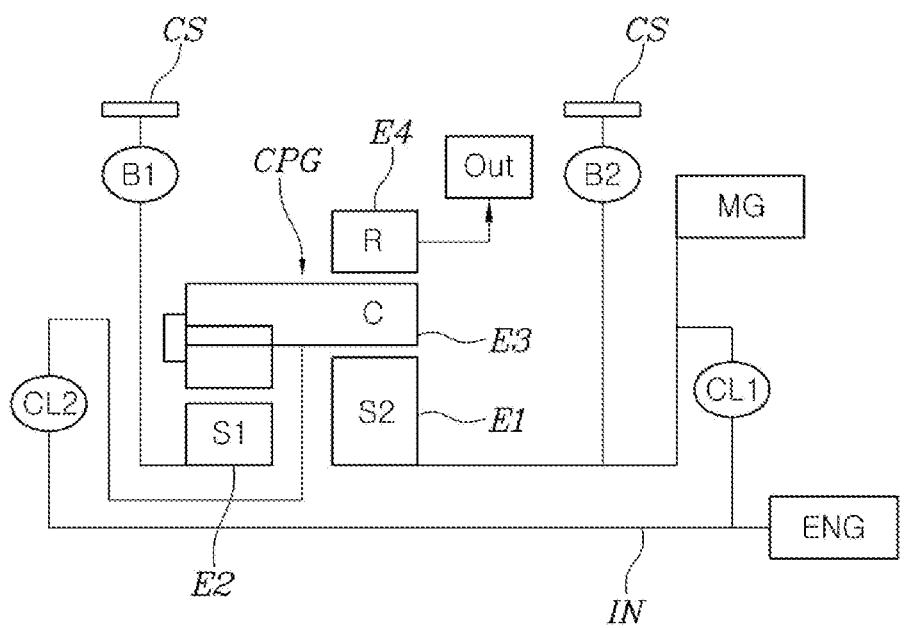
FIG. 24 is a diagram showing an eighteenth exemplary embodiment of a powertrain for a hybrid vehicle according to the present invention.

The eighteenth embodiment of FIG. 24 is an exemplary embodiment which is almost the same as the seventeenth embodiment of FIG. 23 except only that a second brake B2 that can fix the first rotation element E1 of the complex planetary gear set CPG is further included.

Figure 25:
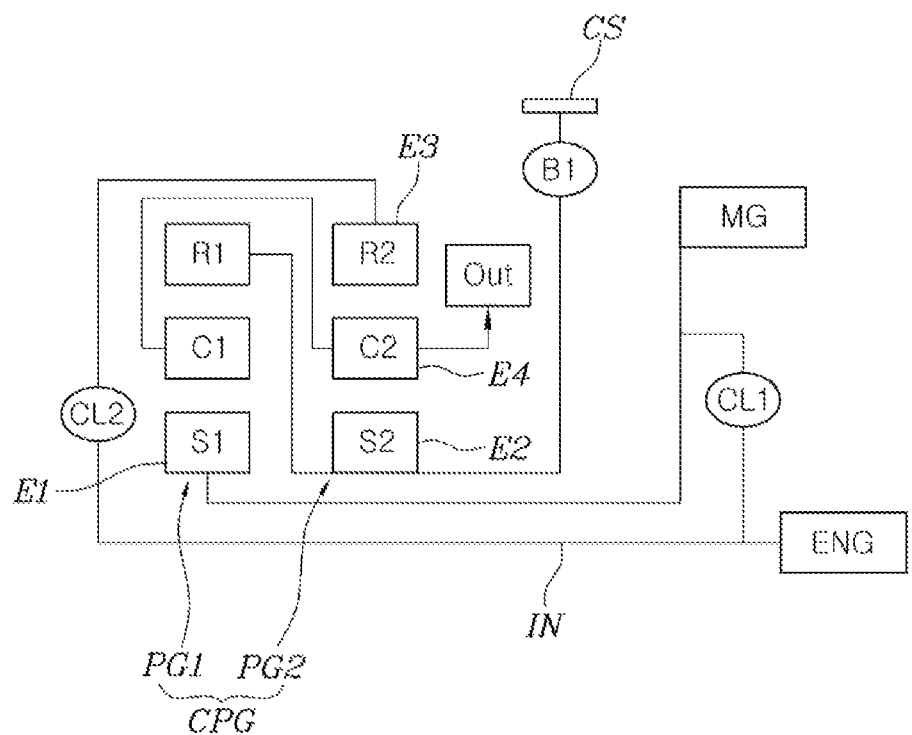
FIG. 25 is a diagram showing a nineteenth exemplary embodiment of a powertrain for a hybrid vehicle according to the present invention.

In the nineteenth embodiment of FIG. 25, the complex planetary gear set CPG includes a first planetary gear set PG1 and a second planetary gear set PG2; the first rotation element E1 is a first sun gear S1 of the planetary gear set PG1; the second rotation element E2 is implemented by connecting a first ring gear R1 of the first planetary gear set PG1 and a second sun gear S2 of the second planetary gear set PG2; the third rotation element E3 is a second ring gear R2 of the second planetary gear set PG2; and the fourth rotation element E4 is implemented by connecting a first planet carrier C1 of the first planetary gear set PG1 and a second planet carrier C2 of the second planetary gear set PG2.

Figure 26:
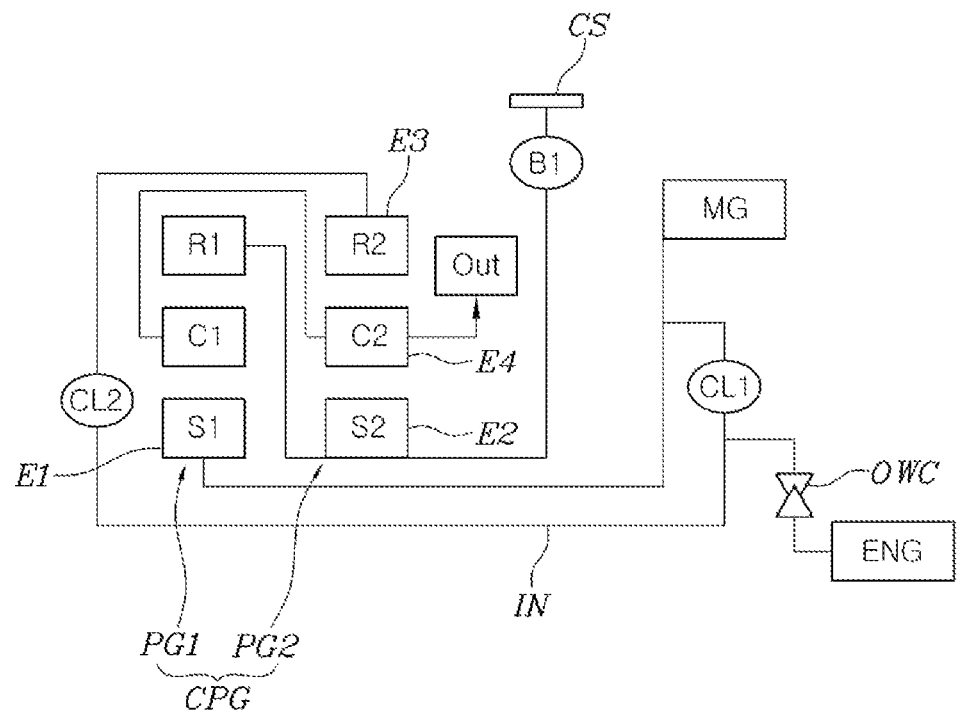
FIG. 26 is a diagram showing a twentieth exemplary embodiment of a powertrain for a hybrid vehicle according to the present invention.

The twentieth embodiment of FIG. 26 is an exemplary embodiment which is almost the same as the nineteenth embodiment of FIG. 25 except only that a one-way clutch OWC is further mounted between the input shaft IN and the engine ENG.

Figure 27:
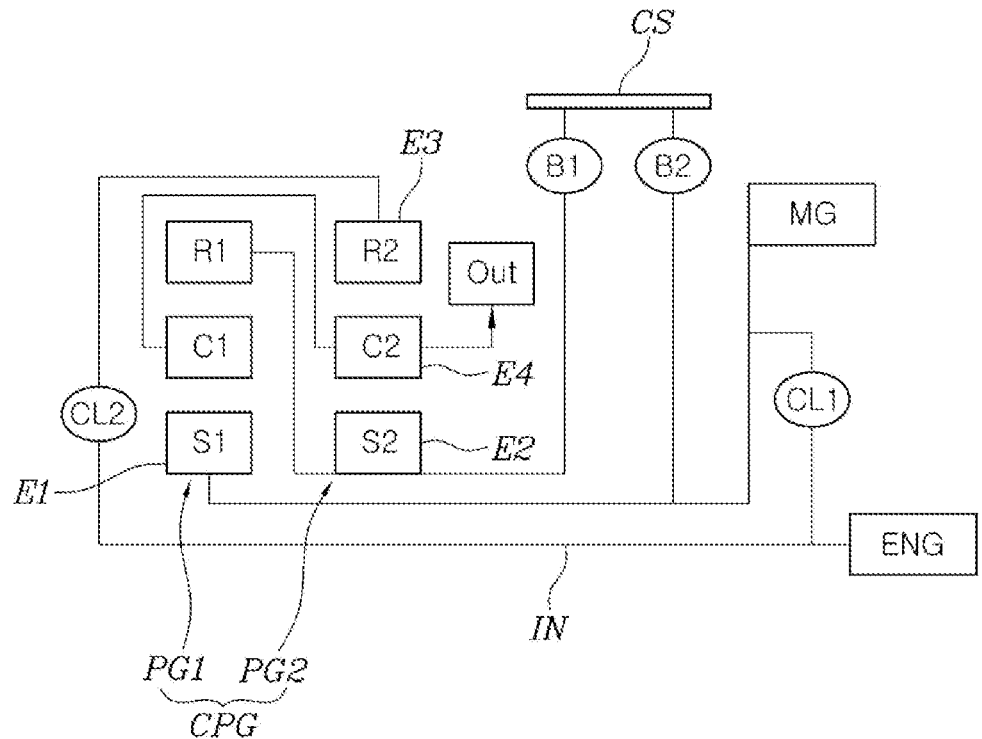
FIG. 27 is a diagram showing a twenty-first exemplary embodiment of a powertrain for a hybrid vehicle according to the present invention.

The twenty-various exemplary embodiments of FIG. 27 is an exemplary embodiment which is almost the same as the nineteenth embodiment of FIG. 25 except only that a second brake B2 that can fix the first rotation element E1 of the complex planetary gear set CPG is further included.

Figure 28:
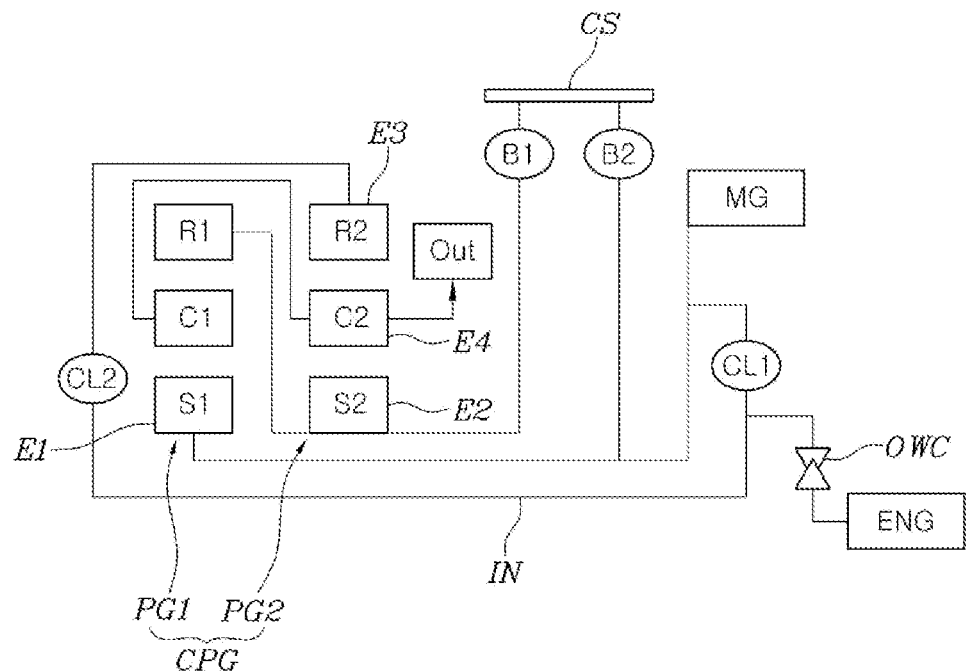
FIG. 28 is a diagram showing a twenty-second exemplary embodiment of a powertrain for a hybrid vehicle according to the present invention.

The twenty-various exemplary embodiments of FIG. 28 is an exemplary embodiment which is almost the same as the twenty-various exemplary embodiments of FIG. 27 except only that a one-way clutch OWC is further mounted between the input shaft IN and the engine ENG.

Figure 29:
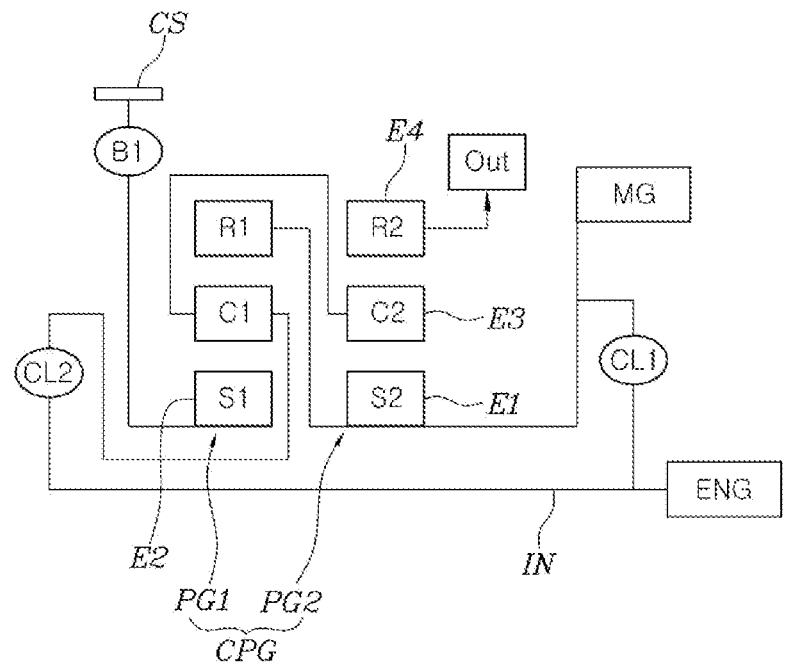
FIG. 29 is a diagram showing a twenty-third exemplary embodiment of a powertrain for a hybrid vehicle according to the present invention.

In the twenty-various exemplary embodiments of FIG. 29, the complex planetary gear set CPG includes a first planetary gear set PG1 and a second planetary gear set PG2; the first rotation element E1 is implemented by connecting a first ring gear R1 of the first planetary gear set PG1 and a second sun gear S2 of the second planetary gear set PG2; the second rotation element E2 is a first sun gear S1 of the first planetary gear set PG1; the third rotation element E3 is implemented by connecting a first planet carrier C1 of the first planetary gear set PG1 and a second planet carrier C2 of the second planetary gear set PG2; and the fourth rotation element E4 is a second ring gear R2 of the second planetary gear set PG2.

The twenty-various exemplary embodiments of FIG. 30 is an exemplary embodiment which is the same as the twenty-various exemplary embodiments of FIG. 29 except only that a second brake B2 that can fix the first rotation element E1 of the complex planetary gear set CPG is further included.

As described above, the seventh to twenty-various exemplary embodiments of FIGS. 13 to 30 are embodiments in which the complex planetary gear set CPG is changed in various ways and accordingly a one-way clutch OWC or a second brake B2 is added in the powertrain of the present invention. Furthermore, in the exemplary embodiments of the present invention, the operation is performed almost in the same way to correspond to the operation in the first to various exemplary embodiments.

As described above, according to various exemplary embodiments of the present invention, it is possible to achieve an engine mode with three stages, an E-CVT mode, an EV mode, and an in-stop charge mode using a fundamental configuration including a complex planetary gear set CPG including four rotation element, two clutches, and one brake, it is possible to further achieve a third stage in the EV mode by adding a one-way clutch OWC to the fundamental configuration, and it is possible to further achieve a fourth stage in the engine mode by adding a second brake. Accordingly, it is possible to provide various stages in various modes using a simple configuration, whereby it is possible to satisfy power performance required for a vehicle and achieve high fuel efficiency.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A powertrain apparatus for a vehicle, the powertrain apparatus including:
   a complex planetary gear set including a first rotation element, a second rotation element, a third rotation element, and a fourth rotation element;
   a motor-generator fixedly connected to the first rotation element of the complex planetary gear set;
   a first brake configured to selectively connect the second rotation element of the complex planetary gear set to a transmission housing;
   an input shaft connected to an engine and selectively connectable to the first rotation element and the third rotation element of the complex planetary gear set; and
   an output shaft fixedly connected to the fourth rotation element of the complex planetary gear set,
   wherein the complex planetary gear set includes a first planetary gear set and a second planetary gear set,
   wherein the first rotation element is a first sun gear of the first planetary gear set,
   wherein the second rotation element is a second sun gear of the second planetary gear set,
   wherein the third rotation element is implemented by connecting a first planet carrier of the first planetary gear set and a second ring gear of the second planetary gear set, and
   wherein the fourth rotation element is implemented by connecting a first ring gear of the first planetary gear set and a second planet carrier of the second planetary gear set.

2. The powertrain apparatus of claim 1, wherein the input shaft is connected to the engine through a one-way clutch.

3. The powertrain apparatus of claim 1, further including a first clutch mounted between the input shaft and the first rotation element.

4. The powertrain apparatus of claim 1, further including a second clutch mounted between the input shaft and the third rotation element.

* * * * *